United States Patent
Balardeta et al.

(10) Patent No.: US 8,845,459 B2
(45) Date of Patent: Sep. 30, 2014

(54) METHOD AND SYSTEM FOR SHOT TRACKING

(75) Inventors: Joseph Balardeta, Encinitas, CA (US); Scott Denton, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 927 days.

(21) Appl. No.: 13/006,220

(22) Filed: Jan. 13, 2011

(65) Prior Publication Data

US 2011/0224025 A1 Sep. 15, 2011

Related U.S. Application Data

(63) Continuation of application No. 12/838,656, filed on Jul. 19, 2010, now abandoned, and a continuation of application No. 12/779,653, filed on May 13, 2010, now Pat. No. 8,560,313, which is a continuation of application No. 12/720,369, filed on Mar. 9, 2010, now Pat. No. 7,942,762.

(51) Int. Cl.
| | |
|---|---|
| *A63F 9/24* | (2006.01) |
| *G06F 17/00* | (2006.01) |
| *A63B 69/36* | (2006.01) |
| *G01S 19/19* | (2010.01) |
| *A63B 71/06* | (2006.01) |
| *A63B 24/00* | (2006.01) |

(52) U.S. Cl.
CPC ........ *A63B 24/0021* (2013.01); *A63B 2071/063* (2013.01); *A63B 2225/50* (2013.01); *A63B 2024/0028* (2013.01); *A63B 2220/807* (2013.01); *A63B 2220/20* (2013.01); *A63B 2243/0029* (2013.01); *A63B 2024/0037* (2013.01); *A63B 2220/14* (2013.01); *A63B 69/3658* (2013.01); *A63B 2024/0031* (2013.01); *A63B 2071/0691* (2013.01); *G01S 19/19* (2013.01); *A63B 2220/12* (2013.01)
USPC .......................................... 473/407; 473/222

(58) Field of Classification Search
CPC ........................ A63B 2243/0029; A63F 13/10
See application file for complete search history.

(56) References Cited

U.S. PATENT DOCUMENTS

| | | |
|---|---|---|
| 3,898,437 A | 8/1975 | Butler |
| 4,367,526 A | 1/1983 | McGeary et al. |
| 4,419,655 A | 12/1983 | May |
| 4,764,666 A | 8/1988 | Bergeron |
| 4,910,677 A | 3/1990 | Remedio et al. |
| 5,043,889 A | 8/1991 | Lucey |
| 5,095,430 A | 3/1992 | Bonito et al. |
| 5,127,044 A | 6/1992 | Bonito et al. |
| 5,214,757 A | 5/1993 | Mauney et al. |
| 5,245,537 A | 9/1993 | Barber |
| 5,261,820 A | 11/1993 | Slye et al. |
| 5,271,034 A | 12/1993 | Abaunza |
| 5,319,548 A | 6/1994 | Germain |
| 5,326,095 A | 7/1994 | Dudley |
| 5,364,093 A | 11/1994 | Huston et al. |
| 5,434,789 A | 7/1995 | Fraker et al. |

(Continued)

*Primary Examiner* — Paul A D'Agostino
(74) *Attorney, Agent, or Firm* — Michael A. Catania; Sonia Lari; Rebecca Hanovice

(57) ABSTRACT

A method for tracking a golfer's round of golf, wherein the method comprises determining a first location of a GPS device, receiving a signal from a first golf club, recording the first location, determining a second location of the GPS, receiving a signal from a second golf club, determining the distance from the first location and the second location and recording the distance as a distance for a first shot of the golfer.

12 Claims, 8 Drawing Sheets

(56) References Cited

U.S. PATENT DOCUMENTS

| | | | |
|---|---|---|---|
| 5,438,518 | A | 8/1995 | Bianco et al. |
| 5,469,175 | A | 11/1995 | Boman |
| 5,507,485 | A | 4/1996 | Fisher |
| 5,524,081 | A | 6/1996 | Paul |
| 5,528,248 | A | 6/1996 | Steiner et al. |
| 5,528,518 | A | 6/1996 | Bradshaw et al. |
| 5,558,333 | A | 9/1996 | Kelson et al. |
| 5,664,880 | A | 9/1997 | Johnson et al. |
| 5,685,786 | A | 11/1997 | Dudley |
| 5,689,431 | A | 11/1997 | Rudow et al. |
| 5,689,717 | A * | 11/1997 | Pritt ................................ 715/234 |
| 5,699,244 | A | 12/1997 | Clark, Jr. et al. |
| 5,740,077 | A | 4/1998 | Reeves |
| 5,772,534 | A | 6/1998 | Dudley |
| 5,779,566 | A | 7/1998 | Wilens |
| 5,797,809 | A | 8/1998 | Hyuga |
| 5,802,492 | A | 9/1998 | DeLorme et al. |
| 5,810,680 | A | 9/1998 | Lobb et al. |
| 5,835,896 | A | 11/1998 | Fisher et al. |
| 5,873,797 | A | 2/1999 | Gam |
| 5,878,369 | A | 3/1999 | Rudow et al. |
| 5,882,269 | A | 3/1999 | Lewis |
| 5,904,727 | A | 5/1999 | Prabhakaran |
| 5,949,679 | A | 9/1999 | Born et al. |
| 6,029,121 | A | 2/2000 | Stashko |
| 6,060,991 | A | 5/2000 | Hsieh |
| 6,111,541 | A | 8/2000 | Karmel |
| 6,171,199 | B1 | 1/2001 | Cohodas et al. |
| 6,263,279 | B1 * | 7/2001 | Bianco et al. ................. 701/450 |
| 6,456,938 | B1 | 9/2002 | Barnard |
| 2008/0293464 | A1 * | 11/2008 | Cheng et al. ...................... 463/3 |
| 2008/0293488 | A1 * | 11/2008 | Cheng et al. .................... 463/31 |
| 2013/0095939 | A1 * | 4/2013 | Meadows et al. ............. 473/222 |

* cited by examiner

METHOD AND SYSTEM FOR SHOT TRACKING

CROSS REFERENCES TO RELATED APPLICATIONS

The present application is a continuation in part of U.S. patent application Ser. No. 12/720,369 filed on Mar. 9, 2010, U.S. patent application Ser. No. 12/779,653 filed on May 13, 2010 and U.S. patent application Ser. No. 12/838,656 filed on Jul. 19, 2010.

STATEMENT REGARDING FEDERALLY SPONSORED RESEARCH OR DEVELOPMENT

Not Applicable

BACKGROUND OF THE INVENTION

1. Field of the Invention

The present invention relates to shot tracking. More specifically, the present invention relates to a method and system for tracking shots of a golfer during a round of golf.

2. Description of the Related Art

Golf clubs combine with the players swing to propel a ball toward a favored location and through a favored path. The orientation and speed of the club head at impact largely determines the ball path including carry distance and roll.

The prior art is lacking in a method and system to measure the motion of the club through measurement of the shaft.

BRIEF SUMMARY OF THE INVENTION

The present invention is novel in that the observation of the relative motion does not depend on near visible light and uses a coherent pattern to capture the position of the club relative the ground antenna transmitter/receiver. This fixed device also includes a display, computing capability and recording device. This information, when processed, enables the display of the swing and uses data on the club head and ball to calculate the flight of the ball.

This invention is a method for tracking a golfer's round of golf. The method comprises determining a first location of a GPS device for a golfer on a golf course, receiving a signal from a first golf club of the golfer that the first golf club struck a golf ball at the first location and recording the first location on the golf course, an identification of the first golf club and a time that the first golf club struck the golf ball at the first location.

The signal of the method is sent from a device comprising a housing and a battery having no more than 225 milliamp hours of power positioned within the housing. The device further comprises a microprocessor positioned within the housing. The microprocessor is in electrical communication with the battery and the microprocessor only operates during a sleep mode, a sampling mode, an analysis mode, a monitoring mode and a transmission mode. The device further comprises a multi-axis accelerometer for determining movement, monitoring movement and communication movement. The multi-axis accelerometer is in electrical communication with the microprocessor and is positioned within the housing. The multi-axis accelerometer is only active during the sampling mode, the analysis mode and the monitoring mode. The device further comprises a radiofrequency component positioned within the housing. The radiofrequency component is in electrical communication with the microprocessor and operates at 2.4 giga-Hertz. The radiofrequency component is operable during a transmission mode, transmitting a signal from the radiofrequency component during the transmission mode wherein the signal comprises data related to the movement monitored by the multi-axis accelerometer. The device consumes less than 600 nano-amps during the sleep mode and the sleep mode has a time period ranging from 10 seconds to 30 seconds. The device consumes less than 15 micro-amps during the sampling mode, less than 50 micro-amps during the analysis mode, less than 200 micro-amps during the monitoring mode and less than 12 milli-amps during the transmission mode.

The device comprises a housing composed of a polymer material, wherein the housing has a main body and a projection body extending from the main body. The projection body has a length ranging from 1 mm to 5 mm and a diameter ranging from 20 mm to 25 mm. A battery is positioned within the housing, along with a microprocessor which is in electrical communication with the battery. The device further comprises a multi-axis accelerometer for determining movement, monitoring movement and communicating the movement to the microprocessor. The multi-axis accelerometer is positioned within the housing and in electrical communication with the microprocessor. The device further comprises a radiofrequency component positioned within the housing. The radiofrequency component is in electrical communication with the microprocessor and operates at 2.4 giga-Hertz. The radiofrequency component transmits a signal comprising data related to the movement monitored by the multi-axis accelerometer.

The method may further comprises determining a location of a GPS device for a golfer on a golf course for every shot of the golfers during a round of golf. The method comprises receiving a signal from a golf club of the golfer that the golf club struck a golf ball at a location for a shot of every shot of the golfer during a round of golf. The method comprises recording the location on the golf course and identifying the golf club and a time that the golf club struck the golf ball at a location for a shot of every shot of the golfer during the round of golf.

Another aspect of the present invention is a system for tracking a golfer's round of golf. The system comprises a plurality of golf clubs, each of the plurality of golf clubs comprising a device attached to a grip which is attached to a shaft which is attached to a golf club head. The device comprises a power source, a means for determining impact, a microprocessor a and a RFID component, wherein impact of a golf club of the plurality of golf clubs swung by the golfer activates the impact means to have the microprocessor transmit a signal from the RFID component for transmission. The signal comprises a type of golf club impacted, and the power source comprises a battery, a resistor and a capacitor, and an RFID component comprising a RFID transponder and a processor. The system further comprises a GPS device for receiving the signal from the RFID component. The system further comprises a GPS device which stores data for each golf shot swung by the golfer for a round of golf, wherein the GPS device is configured to record the current location of the GPS device, an identification of a golf club used by the golfer for each golf shot and the time that the golf club was used to determine a distance for each golf shot based on a current location and a prior location of a prior golf shot.

Yet another aspect of the present invention is a method for tracking a golfer's round of golf wherein the method comprises determining a current location of a GPS device for a golfer on the golf course, receiving a signal from a first golf club of the golfer that the first golf club struck a golf ball at the current location, recording the current location on the GPS device and identifying the first golf club and a time that the first golf club struck the golf ball at the current location. The method further comprising determining a distance from the current location to a prior location and recording the distance as a distance for a prior golf shot of the golfer. This method may further comprise the signal being sent from a device, wherein the device comprises a housing and a battery, wherein the battery is positioned within the housing and the battery has no more than 225 milliamp hours of power. The device further comprises a microprocessor positioned within the housing, the microprocessor in electrical communication with the battery, the microprocessor operating during a sleep mode, a sampling mode, an analysis mode, a monitoring mode and a transmission mode. The device further comprises a multi-axis accelerometer for determining movement, monitoring movement and communicating the movement to the microprocessor. The multi-axis accelerometer is positioned within the housing and the multi-axis accelerometer is in electrical communication with the microprocessor. The power for the multi-axis accelerometer is drawn from the battery and the multi-axis accelerometer is only active during the sampling mode, the analysis mode and the monitoring mode. The device further comprises a radiofrequency component positioned within the housing, the radiofrequency component in electrical communication with the microprocessor. The radiofrequency component operates at 2.4 giga-Hertz and the power for the radiofrequency component is drawn from the battery. The radiofrequency component is only operable during a transmission mode, transmitting a signal from the radiofrequency component during the transmission mode. The signal comprises data related to the movement monitored by the multi-axis accelerometer. The device consumes less than 600 nano-amps during the sleep mode, wherein the sleep mode has a time period ranging from 10 seconds to 30 seconds. The device consumes less than 15 micro-amps during the sampling mode, less than 50 micro-amps during the analysis mode, less than 200 micro-amps during the monitoring mode and less than 12 milli-amps during the transmission mode.

Lastly, this invention comprises a system for tracking a golfer's round of golf, the system comprising a plurality of golf clubs, each of the plurality of golf clubs comprising a shaft and a golf club head. The shaft has a shock switch in electrical communication with an active RFID transponder. The shock switch temporarily closes during impact with a golf ball to provide power from a power source to the RFID transponder for transmission of a signal. The signal comprises the type of club and force of the shot. The system further comprises a GPS device for receiving the signal from the RFID transponder, wherein the GPS device stores data for each shot by the golfer for a round of golf. The GPS device is configured to record the current location of the GPS device, an identification of a golf club used by the golfer for each golf shot and the time that the golf club was used to determine a distance for each golf shot based on a current location and a prior location of a prior golf shot.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

Figure 1:
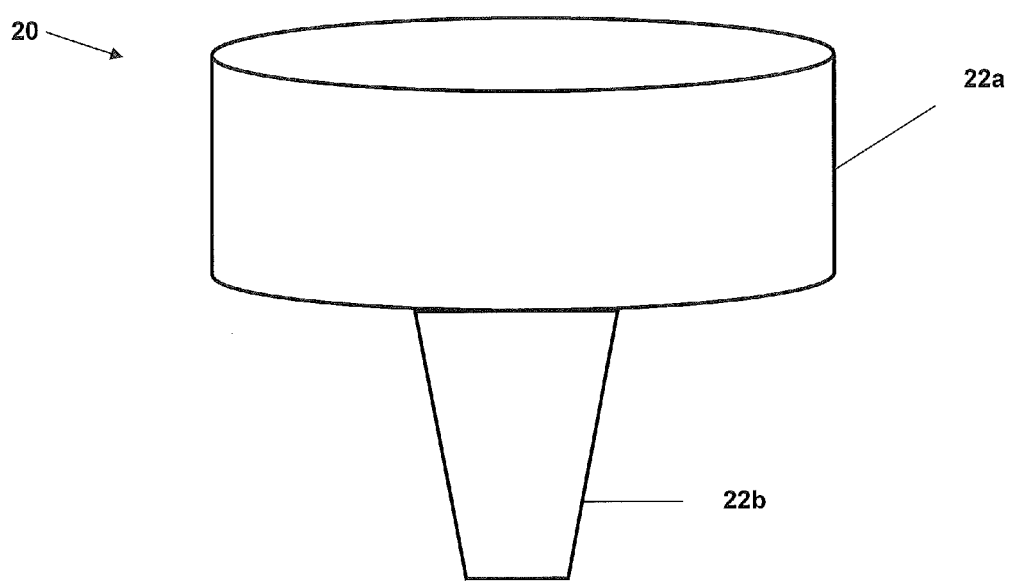
FIG. 1 is a perspective view of the device for shot tracking.

FIG. 1. shows the device 20 of the system 10 which can be attached to a golf club 50.

Figure 2:
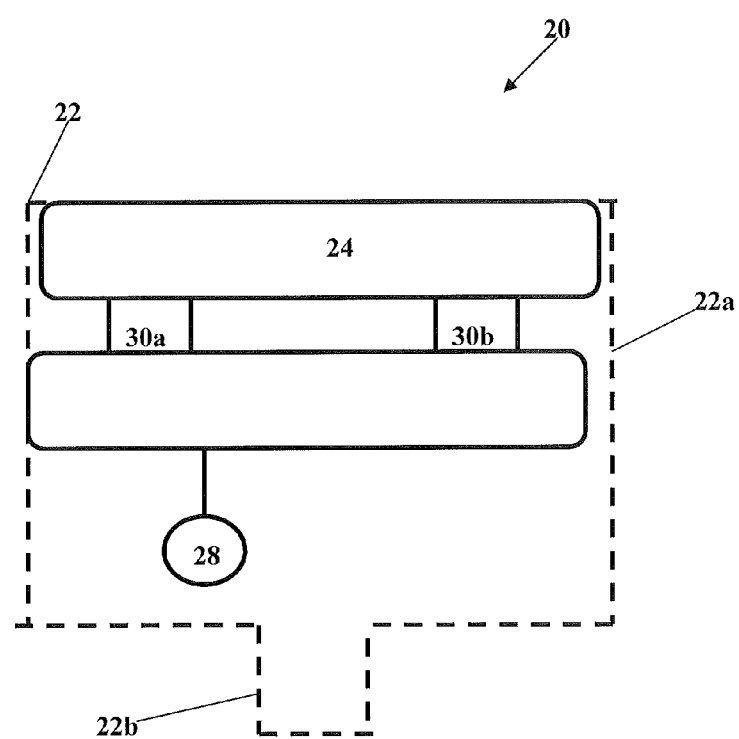
FIG. 2 is a perspective view of components of a device for shot tracking, including the main body and projection body extending downward.

FIG. 2 shows the components of the device 10 for shot tracking, including the main body of the housing and a projection extending downward.

Figure 3:
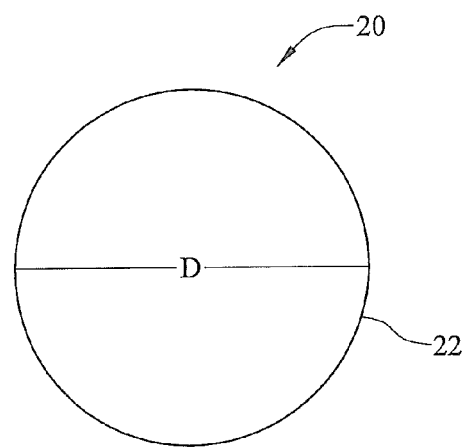
FIG. 3 shows the housing component of the shot tracking device and illustrates the diameter.

FIG. 3 shows the housing component of the shot tracking device and illustrates the diameter.

Figure 4:
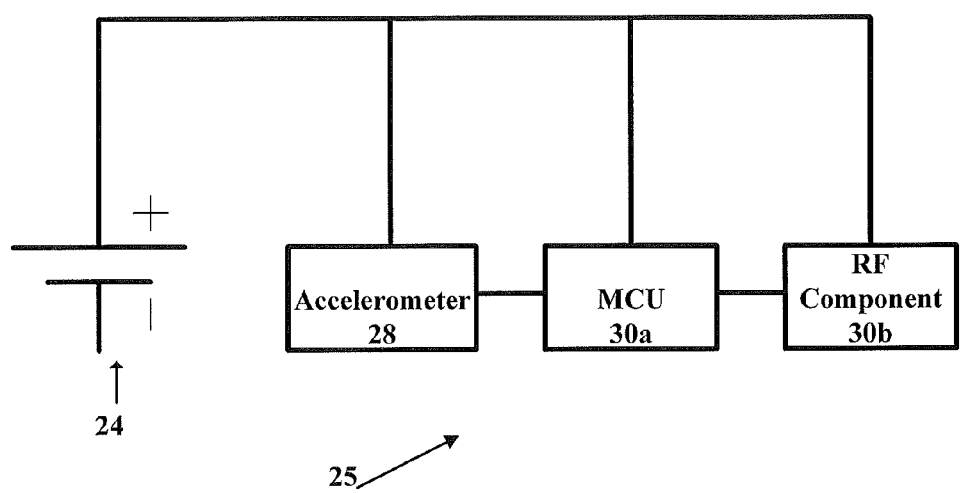
FIG. 4 is an illustration of the circuit diagram of the components of a device for shot tracking.

FIG. 4 illustrates a circuit diagram 25 of the present invention. The components of the device 10 within the golf club 50 preferably include a power source, such as a battery 24, a microprocessor 30($a$), and an RFD transponder and antenna 30($b$).

Figure 5:
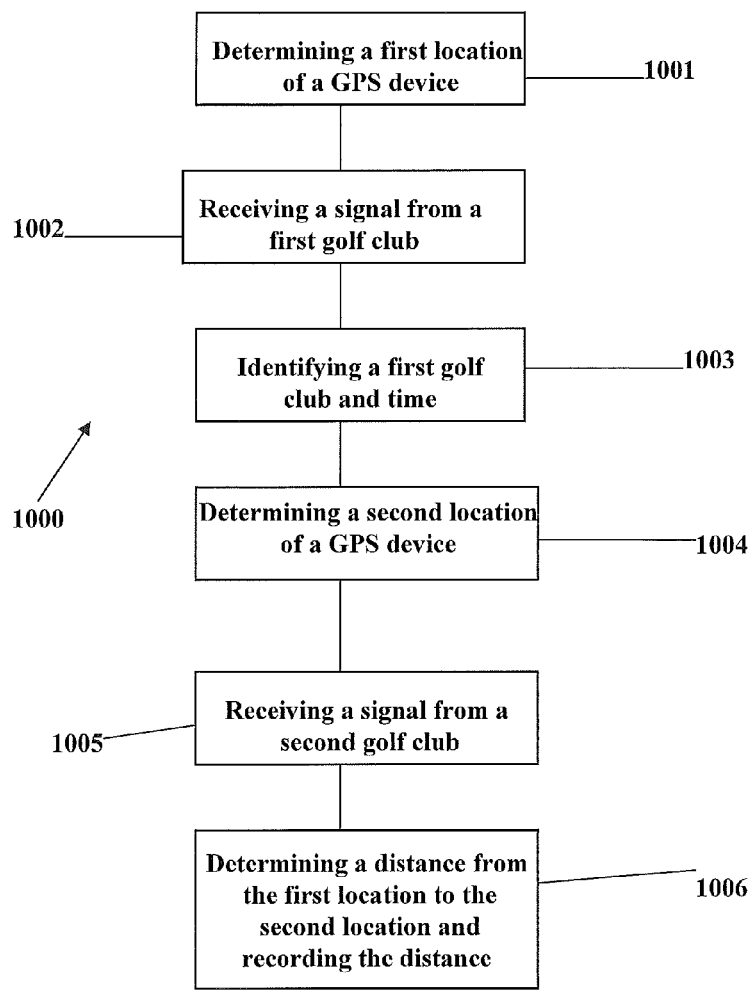
FIG. 5 is a flow chart of a method of shot tracking.

FIG. 5 is a flow chart of a method 1000 for shot tracking At block 1001, a location of the GPS device is determined. At block 1002, signal is received signal from a first golf club of the golfer that the first golf club struck a golf ball. At block 1003, an identification of the first golf club and a time that the first golf club struck the golf ball at the first location is determined. At block 1004, a second location of the GPS device is determined. At block 1005, a signal from a second golf club of the golfer that the second golf club struck the golf ball at the second location is received. At block 1006, a distance from the first location to the second location is determined and recorded as the distance for a first shot of the golfer.

Figure 6:
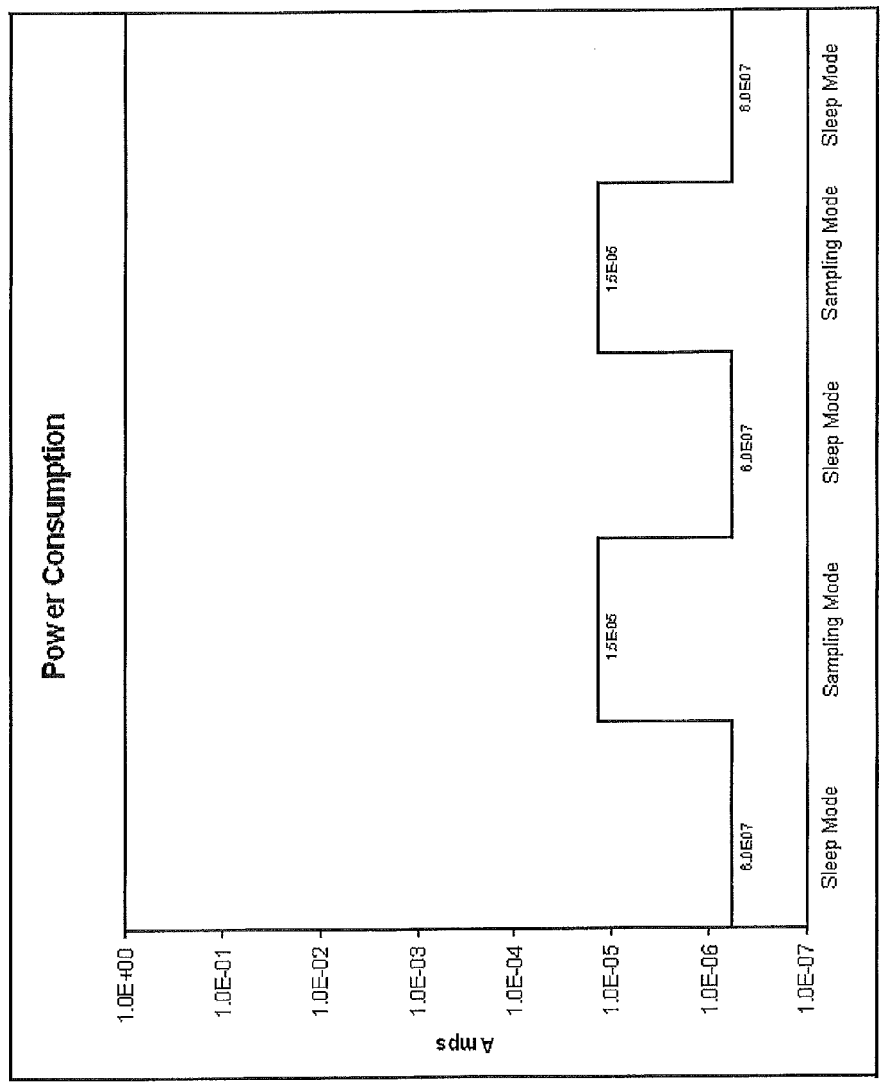
FIG. 6 is a graph of power consumption for a device with a power-saving circuit having a radiofrequency transmission component wherein no motion has been detected.

FIG. 6 is a graph of power consumption for a device with a power-saving circuit having a radiofrequency transmission component wherein no motion has been detected.

Figure 7:
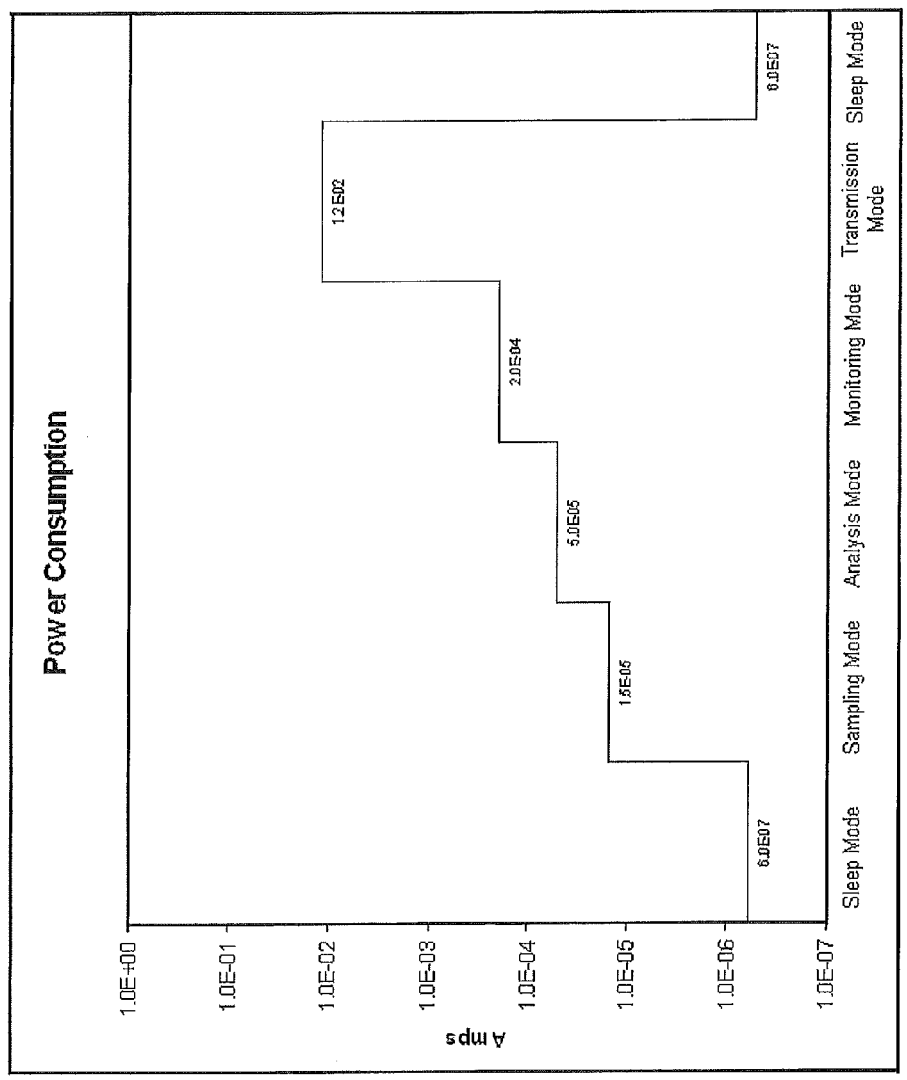
FIG. 7 is a graph of power consumption for a device with a power-saving circuit having a radiofrequency transmission component wherein motion has been detected.

FIG. 7 is a graph of power consumption for a device with a power-saving circuit having a radiofrequency transmission component wherein motion has been detected.

Figure 8:
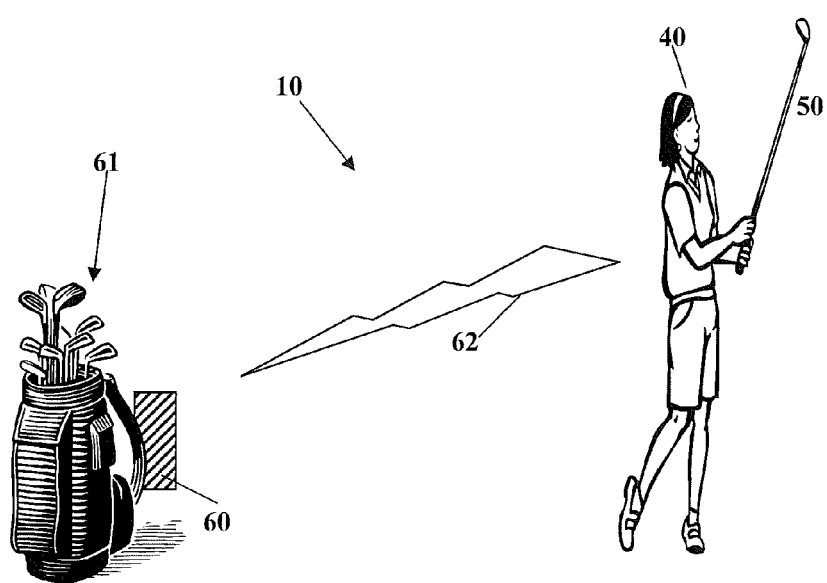
FIG. 8 is an illustration of a system for shot tracking.

FIG. 8 illustrates the system 20. A transponder in a golf club 50 swung by a golfer sends a signal 62 to a receiver 60. The receiver is attached to a golf bag 61, however, those skilled within the pertinent art will recognize that the receiver may be attached to any pertinent device including the golfer, or may stand alone.

This invention is a method 1000 for tracking a golfer's round of golf. The method comprises determining a first location of a GPS device for a golfer on a golf course 1001, receiving a signal from a first golf club of the golfer that the first golf club struck a golf ball and recording the first location on the golf course 1002, an identification of the first golf club and a time that the first golf club struck the golf ball at the first location 1003. The method further comprises determining a second location of the GPS device for the golfer on the golf course 1004, receiving a signal from a second golf club of the golfer that the second golf club struck the golf ball at the second location 1005, determining a distance from the first location to the second location and recording the distance as a distance for a first shot of the golfer 1006.

Preferably, the signal 62 is sent from a device 20, wherein the device 20 comprises a housing 22, a battery 24 having no more than 225 milliamp hours of power, wherein the battery 24 is positioned within the housing 22. The device 20 further comprises a microprocessor 30a positioned within the housing 22, the microprocessor 30a in electrical communication with the battery 24, wherein the microprocessor 30a operates during a sleep mode, a sampling mode, an analysis mode, a monitoring mode and a transmission mode. The device 20 further comprises a multi-axis accelerometer 28 for determining movement, monitoring movement and communicating movement to the microprocessor 30a. The multi-axis accelerometer 28 is positioned within the housing 33 and in electrical communication with the microprocessor 30a. The power from the multi-axis accelerometer 28 is drawn from the battery 24 and the multi-axis accelerometer 28 is only active during the sampling mode, the analysis mode and the monitoring mode. The device 20 further comprises a radiofrequency component 30b positioned within the housing 22, wherein the radiofrequency component 30b is in electrical communication with the microprocessor 30a. The radiofrequency component 30b operates at 2.4 giga-Hertz, and the power is drawn from the battery 24. The radiofrequency component 30b is only operable during the transmission mode, transmitting a signal 62 from the radiofrequency component 30b during the transmission mode, wherein the signal 32 comprises data related to the movement monitored by the multi-axis accelerometer 28. The device 20 consumes less than 600 nano-amps during the sleep mode, wherein the sleep mode has a period that ranges from 10 seconds to 30 seconds. The device 20 consumes less than 15 micro-amps during the sampling mode, less than 50 micro-amps during the analysis mode, less than 200 micro-amps during the monitoring mode and less than 12 milli-amps during the transmission mode.

In an alternative embodiment, the signal 62 is sent from a device 20 comprising a housing 22 composed of a polymer material, wherein the housing has a main body 22a and a projection body 22b extending from the main body 22a. The projection body 22b has a length ranging from 1 mm to 5 mm and a diameter ranging from 20 mm to 25 mm. A battery 24 is positioned within the housing 22 and a microprocessor 30a is positioned within the housing 22, wherein the microprocessor 30a is in electrical communication with the battery 24. The device 20 further comprises a multi-axis accelerometer 28 for determining movement, monitoring movement and communicating the movement to the microprocessor, wherein the multi-axis accelerometer 28 positioned within the housing 22. The multi-axis accelerometer 28 is in electrical communication with the microprocessor 30a. A radiofrequency component 30b is positioned within the housing 22, wherein the radiofrequency component 30b in electrical communication with the microprocessor 30a. The radiofrequency component 30b operates at 2.4 giga-Hertz, and the radiofrequency component 30b transmits a signal 62 comprising data related to the movement monitored by the multi-axis accelerometer 28.

The method may comprise storing the distance for the first shot of the golfer on the GPS device 60, and may further comprise storing uploading the distance for the first shot of the golfer on a golfer's web page of a web site. The method may further comprise determining a location of the GPS device 60 for a golfer 40 on a golf course for every shot of the golfer 40 during a round of golf. The method according may further comprise determining a location of a GPS device 60 for a golfer on a golf course for every shot of the golfer 40 during a round of golf, receiving a signal 62 from a golf club of the golfer 40 that the golf club struck a golf ball at a location for a shot of every shot of the golfer 40 during the round of golf, and recording the location on the golf course, an identification of the golf club 50 and a time that the golf club 50 struck the golf ball at a location for a shot of every shot of the golfer 40 during the round of golf. The method may further comprise determining a time period between the golfer 40 striking the golf ball at the first location and the golfer striking the golf ball at the second location. Further, the method may comprise reassigning the distance of the first shot based on a distance for the second shot.

Another aspect of the present invention is a system 10 for tracking a golfer's 40 round of golf. The system 10 comprises a plurality of golf clubs 50, each of the plurality of golf clubs 50 comprising a device 20 attached to a grip which is attached to a shaft which is attached to a golf club head. The device 20 comprises a power source 24, a means for determining impact, a microprocessor 30a and a RFID component 30b, wherein impact of a golf club 50 of the plurality of golf clubs 50 swung by the golfer 40 activates the impact means to have the microprocessor 30a transmit a signal 62 from the RFID component 30b for transmission. The signal 62 comprises a type of golf club 50 impacted, and the power source 24 comprises a battery, a resistor and a capacitor, and an RFID component 30b comprising a RFID transponder and a processor. The system 10 further comprises a GPS device 60 for receiving the signal 62 from the RFID component 30b. The system 10 further comprises a GPS device 60 which stores data for each golf shot swung by the golfer 40 for a round of golf, wherein the GPS device 60 is configured to record the current location of the GPS device 60, an identification of a golf club 50 used by the golfer 40 for each golf shot and the time that the golf club 50 was used to determine a distance for each golf shot based on a current location and a prior location of a prior golf shot.

The system 10 preferably comprises a web page for the golfer 40, the web page at a web site, wherein the golfer 40 stores the round of golf on the web page. Preferably, the impact means of the system 10 is an accelerometer. Alternatively, the impact means of the system 10 is a shock switch. The impact means may alternatively be a multiple-axis accelerometer.

Another aspect of the present invention is a method 1000 for tracking a golfer's round of golf. The method comprises determining a current location of a GPS device for a golfer on a golf course 1001, receiving a signal from a first golf club of the golfer that the first golf club struck a golf ball at the current location 1002, and recording the current location on the GPS device 1003, an identification of the first golf club and a time that the first golf club struck the golf ball at the current location 1004. The method further comprises determining a distance from the current location to a prior location and recording the distance as a distance for a prior golf shot of the golfer 1006. Preferably the method further comprises uploading the distance for the first shot of the golfer 40 on a golfer's 40 web page of a web site.

The method 1000 further comprises wherein the signal 62 is sent from a device comprising a housing 22, a battery 24 having no more than 225 milliamp hours of power, wherein the battery 24 positioned within the housing 22. A microprocessor 30a is positioned within the housing 22, the microprocessor 30a is in electrical communication with the battery 24 and the microprocessor 30a operates during a sleep mode, a sampling mode, an analysis mode, a monitoring mode and a transmission mode. The device 20 further comprises a multi-axis accelerometer 28 for determining movement, monitoring movement and communicating the movement to the microprocessor 30a. The multi-axis accelerometer 28 is positioned within the housing 22 and the multi-axis accelerometer 28 is in electrical communication with the microprocessor 30a. The power for the multi-axis accelerometer 28 is drawn from the battery 24 and the multi-axis accelerometer 28 is only active during the sampling mode, the analysis mode and the monitoring mode. The device 20 further comprises a radiofrequency component 30b positioned within the housing 22, the radiofrequency component 30b in electrical communication with the microprocessor 30a. The radiofrequency component 30b operates at 2.4 giga-Hertz and the power for the radiofrequency component 30b is drawn from the battery 24. The radiofrequency component 30b is only operable during a transmission mode, transmitting a signal from the radiofrequency component 30b during the transmission mode. The signal 62 comprises data related to the movement monitored by the multi-axis accelerometer 28. The device consumes 20 less than 600 nano-amps during the sleep mode, wherein the sleep mode has a time period ranging from 10 seconds to 30 seconds. The device 20 consumes less than 15 micro-amps during the sampling mode, less than 50 micro-amps during the analysis mode, less than 200 micro-amps during the monitoring mode and less than 12 milli-amps during the transmission mode.

The method further comprises transmission of a signal 62. The signal 62 is sent from a device comprising a housing 22 composed of a polymer material, wherein the housing 22 has a main body 22a and a projection body 22b extending from the main body 22a. The projection body has a length ranging from 1 mm to 5 mm and a diameter ranging from 20 mm to 25 mm. A battery 24 is positioned within the housing and a microprocessor 30a is positioned within the housing 22, wherein the microprocessor 30a in electrical communication with the battery 24. The device 20 further comprises a multi-axis accelerometer 28 for determining movement, monitoring movement and communicating the movement to the microprocessor 30a. The multi-axis accelerometer 28 is positioned within the housing 22, and the multi-axis accelerometer 28 in electrical communication with the microprocessor 30a. The device 20 further comprises a radiofrequency component 30b positioned within the housing 22. The radiofrequency component 30b is in electrical communication with the microprocessor 30a and the radiofrequency component 30b operates at 2.4 giga-Hertz. The radiofrequency component 30b transmits a signal 62 comprising data related to the movement monitored by the multi-axis accelerometer 28. The method 1000 preferably comprises verifying a distance of a prior shot based on a distance of a current shot.

The invention further comprises a system 10 for tracking a golfer's 40 round of golf, the system 10 comprising a plurality of golf clubs 50, each of the plurality of golf clubs 50 comprising a shaft and a golf club head. The shaft has a shock switch in electrical communication with an active RFID transponder. The shock switch temporarily closes during impact with a golf ball to provide power from a power source to the RFID transponder for transmission of a signal. The signal 62 comprises the type of club and force of the shot. The system 10 further comprises a GPS device 60 for receiving the signal 62 from the RFID transponder, wherein the GPS device 60 stores data for each shot by the golfer 40 for a round of golf. The GPS device 60 is configured to record the current location of the GPS device 60, an identification of a golf club 50 used by the golfer 40 for each golf shot and the time that the golf club 50 was used to determine a distance for each golf shot based on a current location and a prior location of a prior golf shot.

Preferably, the microprocessor 30a is configured to transmit data on the golfer's 40 swing in a single transmission. Alternatively, the microprocessor 30a is configured to transmit the data in a plurality of transmission. The microprocessor 30a is preferably configured to monitor the backswing and monitor the downswing at a rate of at least 1 kilo-Hertz or alternatively at a rate of at least 5 kilo-Hertz. The data for the golfer's 40 swing is transmitted at a radiofrequency of 2.4 gigaHertz utilizing the radiofrequency transceiver of the device 20. The device 20 further comprises a battery 24 and a multiple axis accelerometer 28.

The receiver of the system is preferably a GPS device or alternatively a Smart Phone, PDA, or computer.

The battery 24 is preferably a CR1620 having at least 75 milliamps of power. The receiver is preferably a GPS device such as disclosed in Balardeta et al., U.S. Patent Publication Number 20090075761 for a *Golf GPS Device And System*, which is hereby incorporated by reference in its entirety. Alternatively, the receiver is a personal digital assistant (PDA), "smart phone", mobile phone, or other similar device. However, those skilled in the pertinent art will recognize that the receiver may be any device capable of receiving and storing signals from the RFID tag.

Gibbs, et al., U.S. Pat. No. 7,163,468 is hereby incorporated by reference in its entirety.

Galloway, et al., U.S. Pat. No. 7,163,470 is hereby incorporated by reference in its entirety.

Williams, et al., U.S. Pat. No. 7,166,038 is hereby incorporated by reference in its entirety.

Desmulch U.S. Pat. No. 7,214,143 is hereby incorporated by reference in its entirety.

Murphy, et al., U.S. Pat. No. 7,252,600 is hereby incorporated by reference in its entirety.

Gibbs, et al., U.S. Pat. No. 7,258,626 is hereby incorporated by reference in its entirety.

Galloway, et al., U.S. Pat. No. 7,258,631 is hereby incorporated by reference in its entirety.

Evans, et al., U.S. Pat. No. 7,273,419 is hereby incorporated by reference in its entirety.

Hocknell, et al., U.S. Pat. No. 7,413,250 is hereby incorporated by reference in its entirety.

The measurements may be inputted into an impact code such as the rigid body code disclosed in U.S. Pat. No. 6,821,209, entitled *Method for Predicting a Golfer's Ball Striking Performance*, which is hereby incorporated by reference in its entirety.

The swing properties are preferably determined using an acquisition system such as disclosed in U.S. Pat. No. 6,431,990, entitled *System and Method for Measuring a Golfer's Ball Striking Parameters*, assigned to Callaway Golf Company, the assignee of the present application, and hereby incorporated by reference in its entirety. However, those skilled in the pertinent art will recognize that other acquisition systems may be used to determine the swing properties.

Other methods that are useful in obtaining a golfer's swing characteristics are disclosed in U.S. Pat. No. 6,638,175, for a *Diagnostic Golf Club System*, U.S. Pat. No. 6,402,634, for an *Instrumented Golf Club System And Method Of Use*, and U.S. Pat. No. 6,224,493, for an *Instrumented Golf Club System And Method Of Use*, all of which are assigned to Callaway Golf Company, the assignee of the present application, and all of which are hereby incorporated by reference in their entireties.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for tracking a golfer's round of golf, the method comprising:
   determining a first location of a GPS device for a golfer on a golf course;
   receiving a signal from a first golf club of the golfer that the first golf club struck a golf ball at the first location;
   recording the first location on the golf course, an identification of the first golf club and a time that the first golf club struck the golf ball at the first location;
   determining a second location of the GPS device for the golfer on the golf course;
   receiving a signal from a second golf club of the golfer that the second golf club struck the golf ball at the second location;
   determining a distance from the first location to the second location; and
   recording the distance as a distance for a first shot of the golfer, wherein the signal is sent from a device comprising:
   a housing;
   a battery having no more than 225 milliamp hours of power, the battery positioned within the housing;
   a microprocessor positioned within the housing, the microprocessor in electrical communication with the battery, the microprocessor operating during a sleep mode, a sampling mode, an analysis mode, a monitoring mode and a transmission mode;
   a multi-axis accelerometer for determining movement, monitoring movement and communicating the movement to the microprocessor, the multi-axis accelerometer positioned within the housing, the multi-axis accelerometer in electrical communication with the microprocessor, the power for the multi-axis accelerometer drawn from the battery, the multi-axis accelerometer only active during the sampling mode, the analysis mode and the monitoring mode;
   a radiofrequency component positioned within the housing, the radiofrequency component in electrical communication with the microprocessor, the radiofrequency component operating at 2.4 giga-Hertz, the power for the radiofrequency component drawn from the battery, the radiofrequency component only operable during a transmission mode, transmitting a signal from the radiofrequency component during the transmission mode, the signal comprising data related to the movement monitored by the multi-axis accelerometer;
   wherein the device consumes less than 600 nano-amps during the sleep mode, the sleep mode having a time period ranging from 10 seconds to 30 seconds;
   wherein the device consumes less than 15 micro-amps during the sampling mode;
   wherein the device consumes less than 50 micro-amps during the analysis mode;
   wherein the device consumes less than 200 micro-amps during the monitoring mode; and
   wherein the device consumes less than 12 milli-amps during the transmission mode.

2. The method according to claim 1 wherein the signal is sent from a device comprising:
   a housing composed of a polymer material, the housing having a main body and a projection body extending from the main body, the projection body having a length ranging from 1 mm to 5 mm and the a diameter ranging from 20 mm to 25 mm;
   a battery positioned within the housing;
   a microprocessor positioned within the housing, the microprocessor in electrical communication with the battery;
   a multi-axis accelerometer for determining movement, monitoring movement and communicating the movement to the microprocessor, the multi-axis accelerometer positioned within the housing, the multi-axis accelerometer in electrical communication with the microprocessor; and
   a radiofrequency component positioned within the housing, the radiofrequency component in electrical communication with the microprocessor, the radiofrequency component operating at 2.4 giga-Hertz, the radiofrequency component transmitting a signal comprising data related to the movement monitored by the multi-axis accelerometer.

3. The method according to claim 1 further comprising storing the distance for the first shot of the golfer on the GPS device.

4. The method according to claim 1 further comprising uploading the distance for the first shot of the golfer on a golfer's web page of a web site.

5. The method according to claim 1 further comprising determining a location of a GPS device for a golfer on a golf course for every shot of the golfer during a round of golf;
   receiving a signal from a golf club of the golfer that the golf club struck a golf ball at a location for a shot of every shot of the golfer during the round of golf; and
   recording the location on the golf course, an identification of the golf club and a time that the golf club struck the golf ball at a location for a shot of every shot of the golfer during the round of golf.

6. The method according to claim 1 further comprising determining a time period between the golfer striking the golf ball at the first location and the golfer striking the golf ball at the second location.

7. The method according to claim 6 further comprising determining if the time period exceeds a time threshold for the time period.

8. The method according to claim 7 further comprising reassigning the distance of the first shot based on a distance for the second shot.

9. A method for tracking a golfer's round of golf, the method comprising:
   determining a current location of a GPS device for a golfer on a golf course;
   receiving a signal from a first golf club of the golfer that the first golf club struck a golf ball at the current location;
   recording the current location on the GPS device, an identification of the first golf club and a time that the first golf club struck the golf ball at the current location;
   determining a distance from the current location to a prior location; and
   recording the distance as a distance for a prior golf shot of the golfer, wherein the signal is sent from a device comprising:
a housing;
a battery having no more than 225 milliamp hours of power, the battery positioned within the housing;
a microprocessor positioned within the housing, the microprocessor in electrical communication with the battery, the microprocessor operating during a sleep mode, a sampling mode, an analysis mode, a monitoring mode and a transmission mode;
a multi-axis accelerometer for determining movement, monitoring movement and communicating the movement to the microprocessor, the multi-axis accelerometer positioned within the housing, the multi-axis accelerometer in electrical communication with the microprocessor, the power for the multi-axis accelerometer drawn from the battery, the multi-axis accelerometer only active during the sampling mode, the analysis mode and the monitoring mode;
a radiofrequency component positioned within the housing, the radiofrequency component in electrical communication with the microprocessor, the radiofrequency component operating at 2.4 giga-Hertz, the power for the radiofrequency component drawn from the battery, the radiofrequency component only operable during a transmission mode, transmitting a signal from the radiofrequency component during the transmission mode, the signal comprising data related to the movement monitored by the multi-axis accelerometer;
wherein the device consumes less than 600 nano-amps during the sleep mode, the sleep mode having a time period ranging from 10 seconds to 30 seconds;
wherein the device consumes less than 15 micro-amps during the sampling mode;
wherein the device consumes less than 50 micro-amps during the analysis mode;
wherein the device consumes less than 200 micro-amps during the monitoring mode; and
wherein the device consumes less than 12 milli-amps during the transmission mode.

10. The method according to claim 9 further comprising uploading the distance for the first shot of the golfer on a golfer's web page of a web site.

11. The method according to claim 9 wherein the signal is sent from a device comprising:
a housing composed of a polymer material, the housing having a main body and a projection body extending from the main body, the projection body having a length ranging from 1 mm to 5 mm and the a diameter ranging from 20 mm to 25 mm;
a battery positioned within the housing;
a microprocessor positioned within the housing, the microprocessor in electrical communication with the battery;
a multi-axis accelerometer for determining movement, monitoring movement and communicating the movement to the microprocessor, the multi-axis accelerometer positioned within the housing, the multi-axis accelerometer in electrical communication with the microprocessor; and
a radiofrequency component positioned within the housing, the radiofrequency component in electrical communication with the microprocessor, the radiofrequency component operating at 2.4 giga-Hertz, the radiofrequency component transmitting a signal comprising data related to the movement monitored by the multi-axis accelerometer.

12. The method according to claim 9 further comprising verifying a distance of a prior shot based on a distance of a current golf shot.

* * * * *